United States Patent

[11] 3,574,368

| [72] | Inventor | Hubert D. Songer |
| | | Murfreesboro, Tenn. |
| [21] | Appl. No. | 3,298 |
| [22] | Filed | Jan. 16, 1970 |
| [45] | Patented | Apr. 13, 1971 |
| [73] | Assignee | Perfect Equipment Corp. |

[54] PRE-LOADED BALL-JOINT
5 Claims, 4 Drawing Figs.

[52] U.S. Cl. .................................................. 287/87, 308/72
[51] Int. Cl. ..................................................... F16c 11/06
[50] Field of Search ............................................ 287/87, 90 (A), 90 (C); 308/237 (A), 72

[56] References Cited
UNITED STATES PATENTS

| 1,239,520 | 9/1917 | Reeves .......................... | 287/87X |
| 1,945,302 | 1/1934 | Zanzi ............................ | 287/87X |
| 2,096,966 | 10/1937 | Hufferd ........................ | 287/90C |
| 2,147,816 | 2/1939 | Hufferd et al. ................. | 287/90C |
| 2,258,040 | 10/1941 | Young ........................... | 308/72X |
| 2,259,067 | 10/1941 | Hufferd et al. ................. | 287/90C |
| 2,879,091 | 3/1959 | Baker ............................ | 287/87 |
| 3,342,513 | 9/1967 | Melton et al. .................. | 287/90A |
| 3,482,487 | 12/1969 | Leffers .......................... | 287/90AX |

Primary Examiner—David J. Williamowsky
Assistant Examiner—Andrew V. Kundrat
Attorney—Ben V. Zillman ABSTRACT: The invention is in a preloaded ball-joint wherein the ball-head of the stud pin is provided with a sheath such as of phosphor-bronze in wear engagement with a wear-resistant bushing, the sheath being permanently interlocked to said head through a ring that has been initially mounted on said head and which is imbedded in the interior of said sheath during the assembly of the latter onto said head.

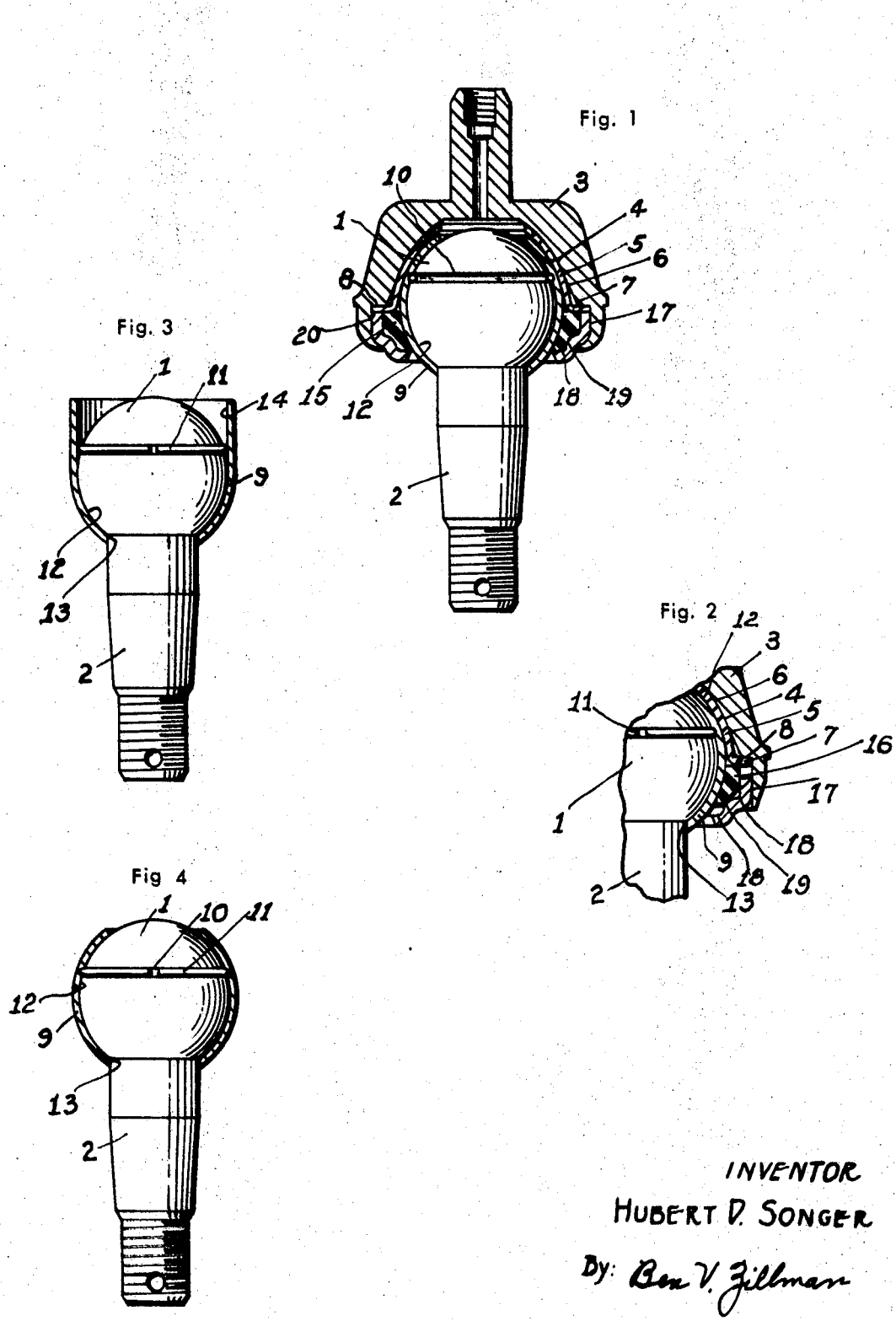

PRE-LOADED BALL-JOINT

BACKGROUND OF THE INVENTION

1. Field of the Invention

The invention is generally in the Invention of ball-joints intended for service on steering linkages and suspension systems of motor vehicles or the like.

One of the principal objects of the invention is to minimize the rate and degree of wear between the relatively movable parts of the joint, and at the same time minimize the cost of manufacture of the joint, by covering the semihard metal ball-head of the joint-pin or stud with a sheath of a relatively softer bearing material, such as of phosphor bronze that is fixedly secured to cover said head and that presents its exterior or convex spherical surface to bear against a bushing of harder material.

The sheath is substantially spherical and of better bearing quality and smoothness than that of said ball-head, so that expensive finishing is not required on said ball-head, the sheath itself serving as the effective wear-element of said stud pin. The low-friction characteristic of the sheath against said bushing acts to minimize wear therebetween during service.

2. Description of the Prior Art

Ball-joints are of course common in the prior art, and even preloaded ball-joints, and softer-material sheaths too, have been shown as mounted on the steel ball-head, but there seems to be a lack of means that mechanically interlocks said sheath in its ball-head enveloping position, so as to absolutely prevent any relative movement between said head and sheath, and especially so at such times as when the joint is under jounce and rebound action, as for instance when the vehicle travels along uneven terrain.

SUMMARY

The instant invention solves the foregoing problem by providing a positive interlock between the ball-head and the sheath, completing the final steps of said interlock in the forming of said sheath.

Another object of the invention is to provide means that yieldably preloaded the complementary surfaces of the ball-joint so as to assure of constant pressure therebetween and to generally maintain the sheathed head within the bushing during normal use of the joint, but when the vehicle goes over rough terrain, causing momentary reverse loading on the joint, the preloading means will absorb such shock of reverse loadings.

Brief Description of the Drawings

FIG. 1 is a vertical cross-sectional view of the assembled joint itself;

FIG. 2 is a fragmentary cross-sectional view of certain parts, during assembly of the same;

FIG. 3 is cross-sectional view, showing the sheath partly assembled on the ball-head; and FIG. 4 is a similar view, showing the sheath pressed to its final position mounted on said ball-head.

DESCRIPTION OF THE PREFERRED EMBODIMENT

In the drawings, wherein there is shown a ball-joint unit intended for use in the front-end suspension parts of a motor vehicle, there is the customary stud pin, generally of a quite strong material, as of steel, having a substantially spherical ball-head end 1 and with a shank portion 2 depending from said head.

A housing member 3, preferably of a steel forging or the like is provided with a concave socket 4 through which the shank of the stud pin extends, and the ball-head is free to rotate and tilt within said socket.

A bushing 5 having an external convex surface 6, and also preferably made of hard metal such as of steel, fits within said socket and preferably has a grease opening through its top, spaced from and leading to the adjacent surface of the sheathed ball-head. This bushing is also open at its lower end and is provided with a radially outwardly directed flange 7 at said lower end, to lie against a shoulder 8 provided within said socket of the housing member.

A sheath or shroud 9 is permanently secured to enclose said ball-head, and is preferably of a material softer than that of the latter, such as of Grade CA-510 phosphor bronze, and which material has been found to have excellent low-friction properties when engaging a steel surfaced bushing.

The ball-head is provided with a rib extending circumferentially about said head, and preferably of substantially semicircular cross section, said rib lying in a plane that is parallel to and spaced from the equatorial plane through said head.

In the form illustrated, said rib is shown as being in a plane that is higher than said equatorial plane in a direction away from the stud shank. Although the rib may be formed integral with the head, it has been illustrated as preferably formed by interposing a snapring 11 on sad head. Said snapring is preferably of a material harder than that of said sheath, as of steel or the like, and there is a substantially semicircular cross section groove 10 formed circumferentially about said head, the depth of said groove being approximately one-half the thickness of said snapring, the other half of said ring projecting radially beyond the adjacent spherical surface of said head so as to form a rib.

The sheath is initially formed to substantially a cup-shape, with a concave portion 12 to closely conform to the exterior surface of said head, and there is a bottom opening 13 through which the stud shank is inserted with a snug fit thereat.

The cup-shaped sheath is then brought up tight against the adjacent end of the head, as shown clearly in FIG. 3, to encircle said shank thereat, and after said snapring has been mounted in the groove in the head, the tubular portion 14 of said sheath extends past said ring and away from the equator of said head, as shown.

Then, while holding the stud in the relationship with the sheath as shown in FIG. 3, the projecting tubular portion of the sheath is forcibly pressed against the adjacent spherical exterior of the head, with sufficient force to form the sheath to its final assembled shape as shown in FIGS. 1 and 4, and in which operation the outwardly projecting portion of the snapring that forms the rib is imbedded securely within the material of the sheath thereby providing a mechanical interlock between the parts, and after which there can be no relative movement between the sheath and ball-head.

It might be mentioned now, and as shown in the drawings, that the opposed surfaces of the sheath and bushing are of mutually different curvatures, so that there is substantially only tangential engagement therebetween.

In order to preload the joint, a pressure absorbent collar 15, of polyurethane or other preferably yieldably resilient bearing material, is locked between the housing and sheath, as indicated in FIG. 1.

Said collar is initially of such form that its inner concave surface receives said sheath therethrough, the bore through said collar being smaller at its bottom than at its top end, and there is a bevel of about 45° angle between its outer tubular wall and its bottom wall, for a purpose now about to be described, and, at its initial placement there is an open space between said collar and a very strong retaining ring.

A retaining ring, as in the form of a cup as shown, is used to hold said collar compressed and is of such configuration that its outer peripheral surface 17 fits initially within the corresponding internal surface of the housing thereat. There are end concave surfaces 18-18 on the inner face of said retaining cup, that extend radially inwardly, these surfaces merging into an intermediate convex surface 19, as shown in FIGS. 1 and 2.

When this retaining cup is in its initial position, with its peripheral outer face 17 engaging the outer peripheral surface of said collar, and as yet unloaded, the highest point of said convex portion 19 just rests against the 45° bevel of said collar.

Now, when pressure is applied axially on said retaining cup forcing it against the member 15 (by approximately 0.020 to 0.030), the lower horizontal surface of the pressure cup is seated against the flange 7 of the bushing which in turn is resting on the recessed ledge or shoulder 20 in the housing socket, and the pressure collar is deformed to fill the open space initially between said pressure cup and collar (shown in FIG. 2).

Now, the exposed lower open end of the housing is then peened radially inwardly as shown in FIG. 1 from the position shown initially in FIG. 2, to thereby lock said collar and retaining cup in place, and insuring that the pressure collar remains yieldably compressed at all times. Although the joint may be equipped with a boot or the like to keep foreign matter from entering into the joint, said element has been omitted from the drawings, simply for the sake of simplicity.

Grease openings are shown in the embodiment shown to communicate with the top grease open previously mentioned.

I claim:

1. In a ball-joint provided with a ball-headed stud rotatable and tiltable in a housing member, the shank of said stud projecting through an end opening in said housing member, a sheath softer than said ball-head fixedly mounted on the latter to provide for wear caused by said rotational and tilting movement, and a rib encircling said head and projecting radially therebeyond to interlock with said sheath, said rib being formed by interlocking a ring circumferentially with said head to project radially outwardly from the latter, said ring lying in a plane that is parallel to the equatorial plane through said head.

2. A In a ball-joint as set forth in claim 1, further characterized in that the plane of said rib is parallel to and to one side of the equatorial plane of said head.

3. In a joint as set forth in claim 2, further characterized in that said plane in which said rib lies is closer to the top of said head than to said stud shank.

4. In a joint as set forth in claim 3, further characterized in that said rib is of a material that is harder than that of said sheath so that said rib will imbed into said sheath when the latter is forced radially inwardly onto said rib, after mounting said sheath on said ball-head.

5. In a ball-joint provided with a ball-headed stud rotatable and tiltable in a housing member through one end thereof and wherein the shank of said stud extends beyond said end, resilient means between said housing and head to yieldably preload said joint, said means having an inner concave surface to engage with and conform to the convex exterior of said head and with an initially beveled outer bottom corner, and a retaining cup encircling said means and provided with an intermediate portion projecting radially inwardly toward said beveled corner of said means there being an annular open space between said means and cup, said retaining cup provided with radially outwardly projecting portions extending to either side of said intermediate portion, whereby forcing said retaining cup axially deforms said means to fill said aforesaid space and preload said joint.